US010289286B2

(12) United States Patent
Sieth et al.

(10) Patent No.: US 10,289,286 B2
(45) Date of Patent: May 14, 2019

(54) THING MODELER FOR INTERNET OF THINGS

(71) Applicant: SAP SE, Walldorf (DE)

(72) Inventors: Thilo Sieth, Bad Rappenau (DE); Michael Danninger, Landau (DE)

(73) Assignee: SAP SE, Walldorf (DE)

( * ) Notice: Subject to any disclaimer, the term of this patent is extended or adjusted under 35 U.S.C. 154(b) by 167 days.

(21) Appl. No.: 15/348,488

(22) Filed: Nov. 10, 2016

(65) Prior Publication Data

US 2018/0131576 A1    May 10, 2018

(51) Int. Cl.
| | | |
|---|---|---|
| G06F 16/80 | (2019.01) | |
| H04L 12/24 | (2006.01) | |
| H04L 29/08 | (2006.01) | |
| G06F 3/0484 | (2013.01) | |

(52) U.S. Cl.
CPC ......... *G06F 3/04842* (2013.01); *G06F 16/80* (2019.01); *H04L 41/0233* (2013.01); *H04L 41/22* (2013.01); *H04L 67/12* (2013.01)

(58) Field of Classification Search
CPC ............... G06F 3/0482; G06F 3/04842; G06F 3/04847; G06F 16/80; H04L 41/145; H04L 41/22; H04L 67/12; H04L 41/0233
See application file for complete search history.

(56) References Cited

U.S. PATENT DOCUMENTS

| | | | | |
|---|---|---|---|---|
| 2016/0085768 A1* | 3/2016 | Hashimoto | ........... | G06F 21/606 |
| | | | | 707/737 |
| 2016/0105292 A1* | 4/2016 | Choi | ....................... | H04L 51/02 |
| | | | | 709/206 |
| 2018/0019929 A1* | 1/2018 | Chen | ..................... | H04L 41/145 |

* cited by examiner

*Primary Examiner* — Gil H. Lee
(74) *Attorney, Agent, or Firm* — Buckley, Maschoff & Talwalkar LLC

(57) ABSTRACT

A system, method, and computer-readable medium, to define and create a thing type and a thing regarding an internet of things environment, the thing type being a data structure of a category of a thing representing a real world entity and the thing being a data structure defining an instance of a thing type.

18 Claims, 24 Drawing Sheets

| Thing Data | | | 🔍 Frank Decker ⌄ |
|---|---|---|---|
| Master Data (22) 🔍 ⟳ | | Thing Type | |
| Motor | | | |
| Carriage 2 | 〰️ Motor<br>Time Series attributes related to the motor | | Where used (3) |
| | | | |
| | Measured Values — 1905 | | + |
| | Name | Description | Unit of Measure | Type | |
| | Oil Fillage | Description | Liter | Text | Length 15 ✏️ ⊗ |
| | Oil Temperature | Description | Degree Celsius | Text | 15 ✏️ ⊗ |
| | Oil Pressure | Description | kW | Number | 15 ✏️ ⊗ |
| | Calculated Values — 1910 | | + |
| | Name | Description | Unit of Measure | Type | |
| | Average Temperature | Description | Degree Celsius | Float | Length 15 ✏️ ⊗ |
| | Status Values — 1915 | | |
| | Name | Description | | Type | |
| | Motor On/Off | Description | | Boolean | ✏️ ⊗ |
| | Motor Ready | Description | | Boolean | ✏️ ⊗ |
| + ⇅ ▽ 8 | | | Save   Cancel   Thing Properties Catalog |

RECEIVE, FROM A USER VIA A USER INTERFACE, AN INDICATION OF A MODEL OF A THING TYPE TO DEFINE, THE THING TYPE BEING A DATA STRUCTURE OF A CATEGORY OF A THING REPRESENTING A REAL WORLD ENTITY
2205

RECEIVE, FROM THE USER, AN INDICATION OF ONE OR MORE PROPERTIES DEFINING CHARACTERISTICS OF THE THING TYPE
2210

RECEIVE, FROM THE USER, AN INDICATION OF ONE OR MORE DATA POINTS TO DEFINE AT LEAST ONE PROPERTY OF THE THING TYPE
2215

RECEIVE, FROM THE USER, AN INDICATION OF ONE OR MORE STATES TO DEFINE AT LEAST ONE ASPECT OF THE THING TYPE
2220

RECEIVE, FROM THE USER, AN INDICATION OF A SOURCE FOR AT LEAST ONE OF A MEDIA FILE AND A DOCUMENT FILE
2225

SAVING A RECORD OF THE RECEIVED INDICATIONS DEFINING A MODEL OF THE THING TYPE IN A PERSISTENT MEMORY
2230

RECEIVE, FROM A USER VIA A USER INTERFACE, AN INDICATION OF A MODEL OF A THING TO DEFINE, THE THING BEING A DATA STRUCTURE DEFINING AN INSTANCE OF A THING TYPE AND THE THING TYPE BEING A DATA STRUCTURE OF A CATEGORY OF A THING REPRESENTING A REAL WORLD ENTITY      2305

RECEIVE, FROM THE USER, AN INDICATION OF ONE OR MORE PROPERTIES DEFINING CHARACTERISTICS OF THE THING, EACH PROPERTY HAVING A VALUE FIELD      2310

RECEIVE, FROM THE USER, AN INDICATION OF A SPECIFIC VALUE TO ASSIGN TO EACH OF THE VALUE FIELDS      2315

RECEIVE, FROM THE USER, AN INDICATION OF ONE OR MORE DATA POINTS TO DEFINE AT LEAST ONE PROPERTY OF THE THING      2320

RECEIVE, FROM THE USER, AN INDICATION OF ONE OR MORE STATES TO DEFINE AT LEAST ONE ASPECT OF THE THING      2325

RECEIVE, FROM THE USER, AN INDICATION OF A SOURCE FOR AT LEAST ONE OF A MEDIA FILE AND A DOCUMENT FILE      2330

SAVE A RECORD OF THE RECEIVED INDICATIONS DEFINING A MODEL OF THE THING IN A PERSISTENT MEMORY      2335

*FIG. 23*

THING MODELER FOR INTERNET OF THINGS

BACKGROUND

The Internet of Things (IoT) can be used to describe many aspects of the real world. Given the vastness and possibilities, describing the many different things can be a time consuming process. Each and every machine, system, and device may have to be defined in order to be effectively represented in the digital world.

However, some users may have a desire for a tool to efficiently create an integrated model of things in a IoT context.

BRIEF DESCRIPTION OF THE DRAWINGS

FIG. 5 is a block diagram of an apparatus, according to some embodiments;
FIG. 6 is an outward view of an example embodiment of a user interface of an embodiment herein;
FIG. 7 is an outward view of an example embodiment of a user interface of an embodiment herein;
FIG. 8 is an outward view of an example embodiment of a user interface of an embodiment herein;
FIG. 9 is an outward view of an example embodiment of a user interface of an embodiment herein;
FIG. 10 is an outward view of an example embodiment of a user interface of an embodiment herein;
FIG. 11 is an outward view of an example embodiment of a user interface of an embodiment herein;
FIG. 12 is an outward view of an example embodiment of a user interface of an embodiment herein;
FIG. 15 is an outward view of an example embodiment of a user interface of an embodiment herein;
FIG. 16 is an outward view of an example embodiment of a user interface of an embodiment herein;
FIG. 19 is an outward view of an example embodiment of a user interface of an embodiment herein;
FIG. 20 is an outward view of an example embodiment of a user interface of an embodiment herein;
FIG. 21 is an outward view of an example embodiment of a user interface of an embodiment herein;
FIG. 22 is an example flow diagram of a process of an embodiment herein;
FIG. 23 is an example flow diagram of a process of an embodiment herein.

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
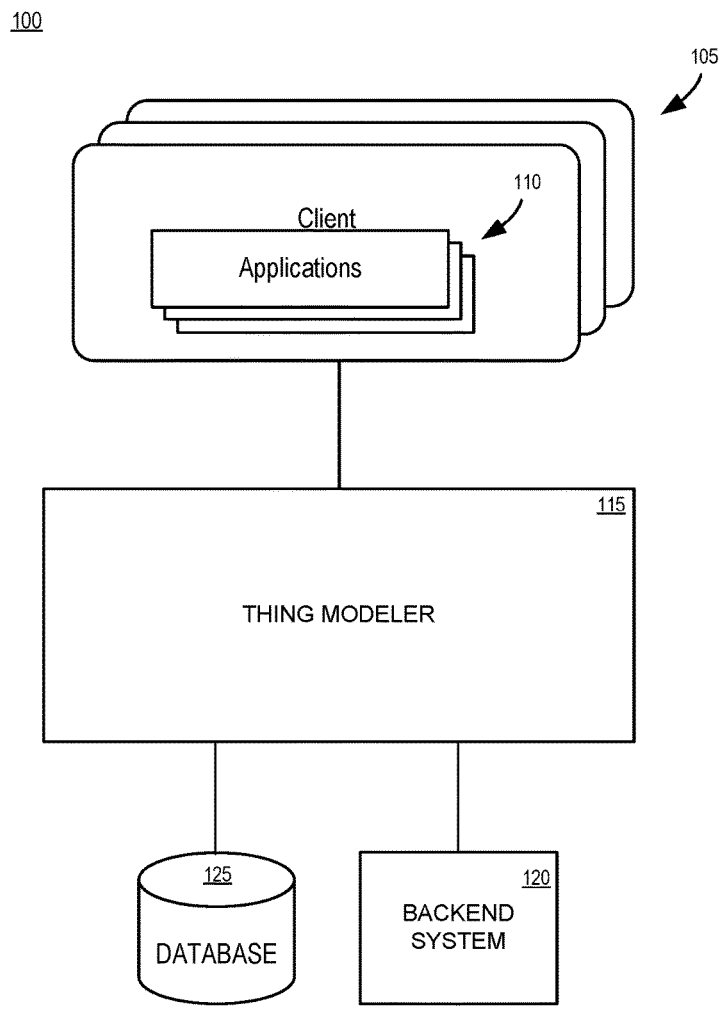
FIG. 1 is an illustrative schematic diagram of a system.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization. In some embodiments, one of the applications 110 may include functionality or a tool to define and create models representative of things in the context or environment of the Internet of Things (IoT). In some aspects herein, "thing" can be any real-world entity. In some aspects and examples of the present disclosure, a thing will refer to an entity of interest to a user and/or organization, including a machine, a system, device, and components thereof. In some embodiments, a thing herein can include two aspects—a thing type and a thing. The "thing type" refers to a category or type of thing (e.g., a car, a truck, an airplane, etc.) and the "thing" refers to an instance of the thing type (e.g., a specific make & model of car delivered to a customer). In some embodiments, applications 110 may be configured to facilitate, support, and execute a program to create both the thing types ("tts") and things ("ts") comprising a thing model. The models created and processed herein may be implemented by a data structure. The data structure may be stored in a persistent memory, where it can be accessed for a future use, including the modification thereof to represent new and different things. The functionality or tool that may be implemented by one of applications 110 may be device agnostic, working across different devices and technologies.

System 100 includes a cross-platform thing modeler service or server 115. In some embodiments, a functionality or service for creating and editing of thing models may be deployed as a cloud-based service, whereas in some other embodiments system 100 may include a client-server architecture. System 100 may encompass both scenarios. In the instance system 100 includes a server at 115, the devices at 105 may be client devices running applications as discussed above. In an instance system includes a cloud-based server at 115, the devices at 105 may execute a browser that is used by a user to interface with service 115.

System 100 further includes a backend system that can create and edit thing models specified by a user. In some aspects herein, a user may provide an indication of the features and aspects of a thing type and instances thereof (i.e., things) to be created or modified, as implemented in an application 110 and/or server or service 115, which may operate in cooperation with the processing of a backend system 120 to generate a program to effectuate the thing model that may be used in the development of IoT applications.

In one example, a client 105 executes an application 110 to present a thing modeler tool via a user interface (UI) to a user on a display of client 105. The user manipulates UI elements within the UI to indicate and specify aspects and features of a thing type and a thing to be defined, where a server or service 115 embodying the IoT modeler operates, in cooperation with backend system 120 and database 125 to generate a data structure representation of a thing of interest to the user. The created thing model and instances thereof may be presented to the user in a view including, for example, a report, a dashboard, or other record.

Data store 125 may comprise any data source or sources that are or become known. Data store 125 may comprise a relational database, a HTML document, an eXtendable Markup Language (XML) document, or any other data storage system storing structured and/or unstructured data files. The data of data store 125 may be distributed among several data sources. Embodiments are not limited to any number or types of data sources.

Data store 125 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Figure 2:
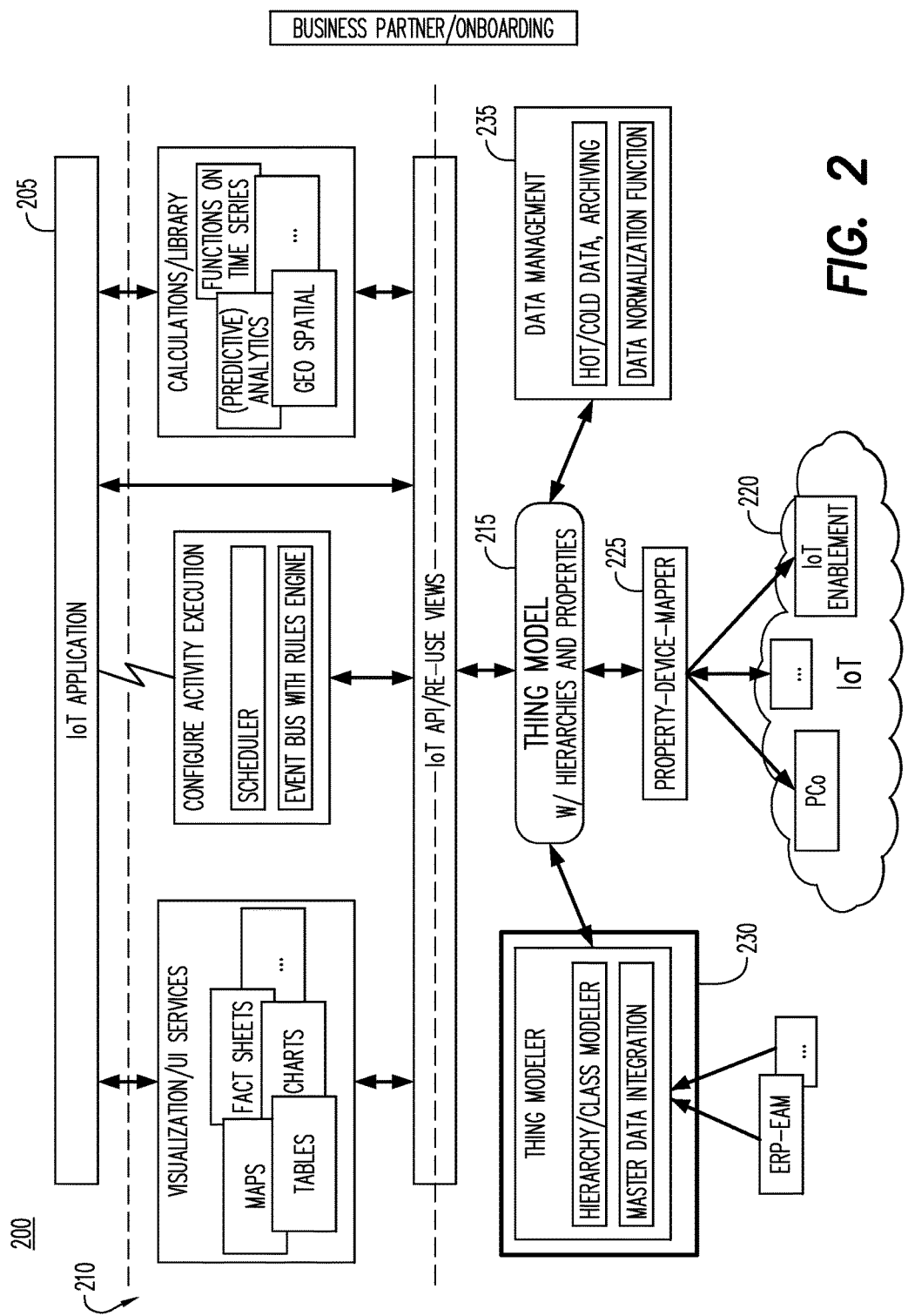
FIG. 2 is an example flow diagram.

FIG. 2 is an illustrative logical depiction of an example platform or frame work 200. Platform 200 may be implemented using a system including some, all, or none of the aspects shown in FIG. 1. Platform 200 includes, in general, an IoT application 205 that interfaces with a technology platform 210 of an enterprise or organization. The IoT application 205 may provide one or more functionalities related to things in the IoT environment. As such, the IoT application may use a model (i.e., representation) of the thing of interest to the IoT application. Thing model 215 provides a mechanism to generate the models of the things of interest to the IoT application 205. Thing model 215 includes the relationships and properties defining the thing model. Thing modeler 230 builds the thing, including defining the hierarchy and classes of the data structure, as well as the data related thereto, reflecting the model being created. A data management component 235 includes and provides functionality to, for example, archive, process, and transform data related to the defining of the thing models (as necessary). A property device mapper 225 can interface with the real-world entities 220 being modeled and determine the properties of the real-world entities required to sufficiently specify and define the things in order to create a thing model that is a "digital twin" of the real-world entities 220.

Figure 3:
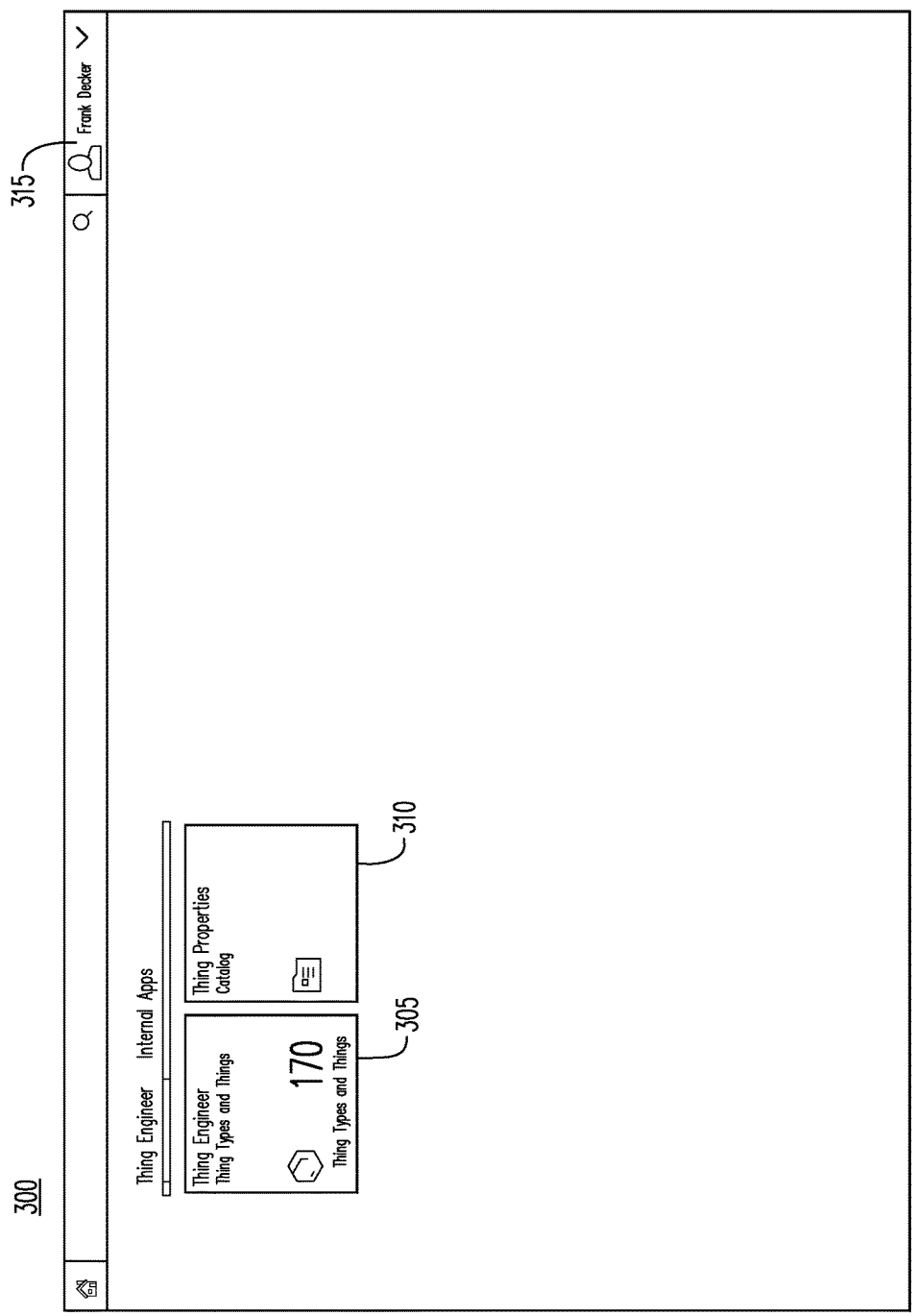
FIG. 3 is an example flow diagram of a process herein.

FIG. 3 is an outward view of a user interface (UI) 300 of a thing modeler (e.g., FIG. 2, 230) that may be used to create and modify aspects of a thing, including both aspects of thing types and things. As seen, UI includes a UI element 305 representing a thing modeler 305 to create and modify things, as well as a thing products catalog 310. In some aspects herein, the present disclosure includes and relates to a persona of a "thing engineer". A thing engineer herein is a person having the role of identifying and creating the thing types (tts) and the things (ts), which is facilitated by the thing modeler aspects herein. The thing engineer may also be tasked with maintaining the tts and ts so that they are current and up-to-date based on the real-world counterparts of the things being modeled. The thing engineer may also be responsible for the onboarding of new things (i.e., the creation of instances of the things in accordance with the modeled things). In some embodiments, the role of a thing engineer may reside in one person, in other embodiments a team or more than one individual may encompass the functions of the thing engineer. In the example of FIG. 3, the thing engineer is performed by "Frank Decker" as indicated at 315. In some embodiments, the thing engineer may be registered to the system implementing the thing modeler herein and may further be authorized to interact with the system based on some security credentials they possess.

Figure 4:
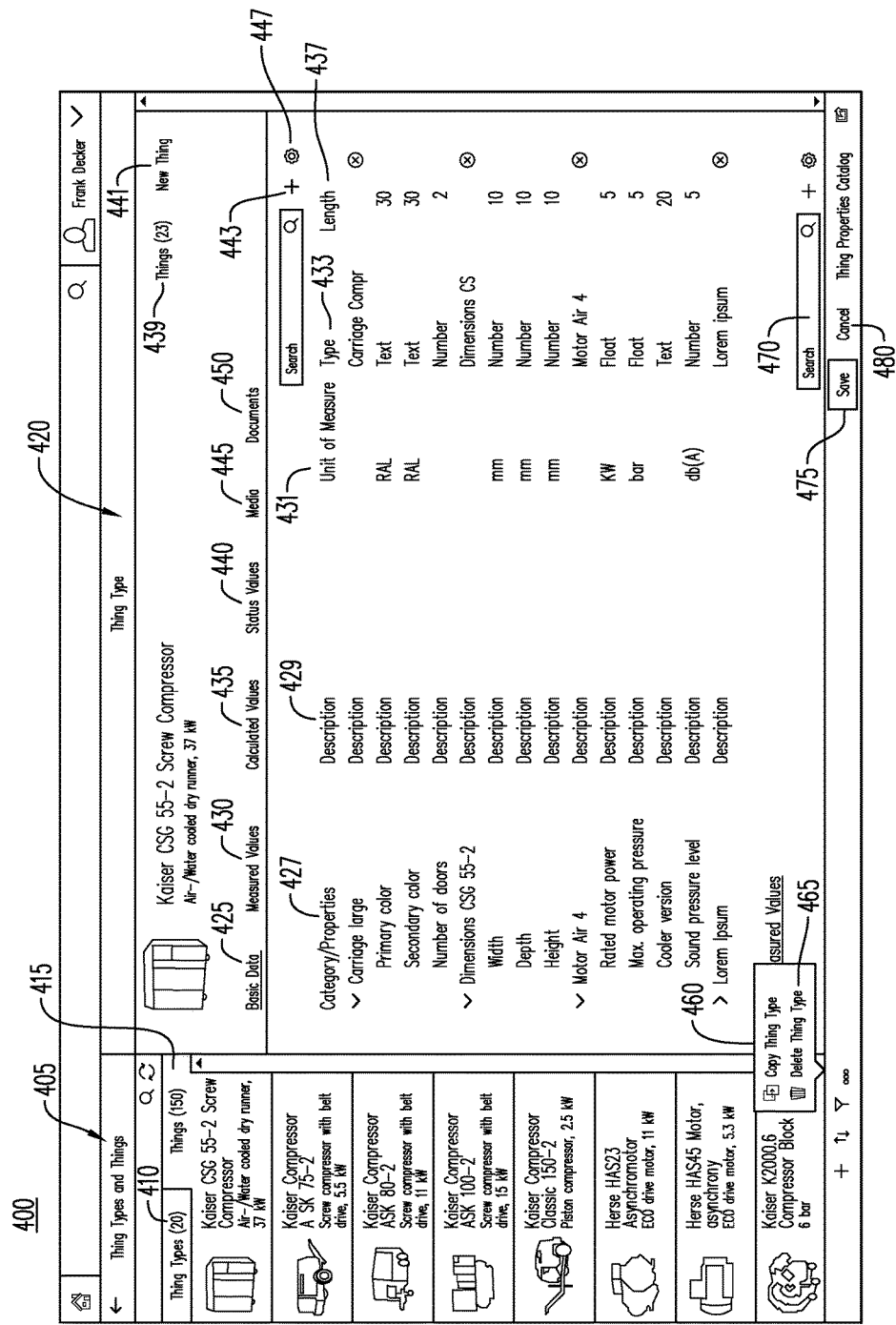
FIG. 4 is an outward view of an example embodiment of a user interface of an embodiment herein.

FIG. 4 is an outward view of a UI 400. This UI relates to a thing types and things module as indicated at 405. Furthermore, UI 400 relates to the thing types of a thing as indicated by the highlighted UI button 410, although the same UI may be used to navigate to a things aspect by selecting UI button 415. In the example of FIG. 4, there are 20 different thing types or categories of things. Details relating to the selected thing type in the listing under 410 is shown in work area 420 of UI 400. Work area 420 includes a listing of different aspects of the properties related to the selected thing type, including basic data 425, measured values 430, calculated values 435, status values 440, media 445, and documents 450. In FIG. 4, the basic data information is selected and shown.

The basic data includes different categories of properties that define the thing type being created, including fields for a description of the category 429, a unit of measure 431, a type 433 regarding the particular property (e.g., text, number, etc.), and a length 437 of the expected value for the property. UI 400 includes a mechanism 443 to add a new category to the thing type being modeled, thereby providing flexibility in defining and creating thing types. Also, setting button 447 provides a mechanism to adjust other configuration settings related to the basic data. At 439 an indication of the number of things associated with the present thing type being defined is shown. At 441, there is a UI element that can be selected to initiate the creation of a new thing.

UI 400 includes a number of navigation and control UI elements that can be used to copy a thing type 460, delete a thing type 465, and enter search criteria 470. Save button 475 may be used to have entries and changes enter via UI 400 committed to the system, whereas cancel button 480 may be used to discard entries prior to the saving thereof.

Figure 5:
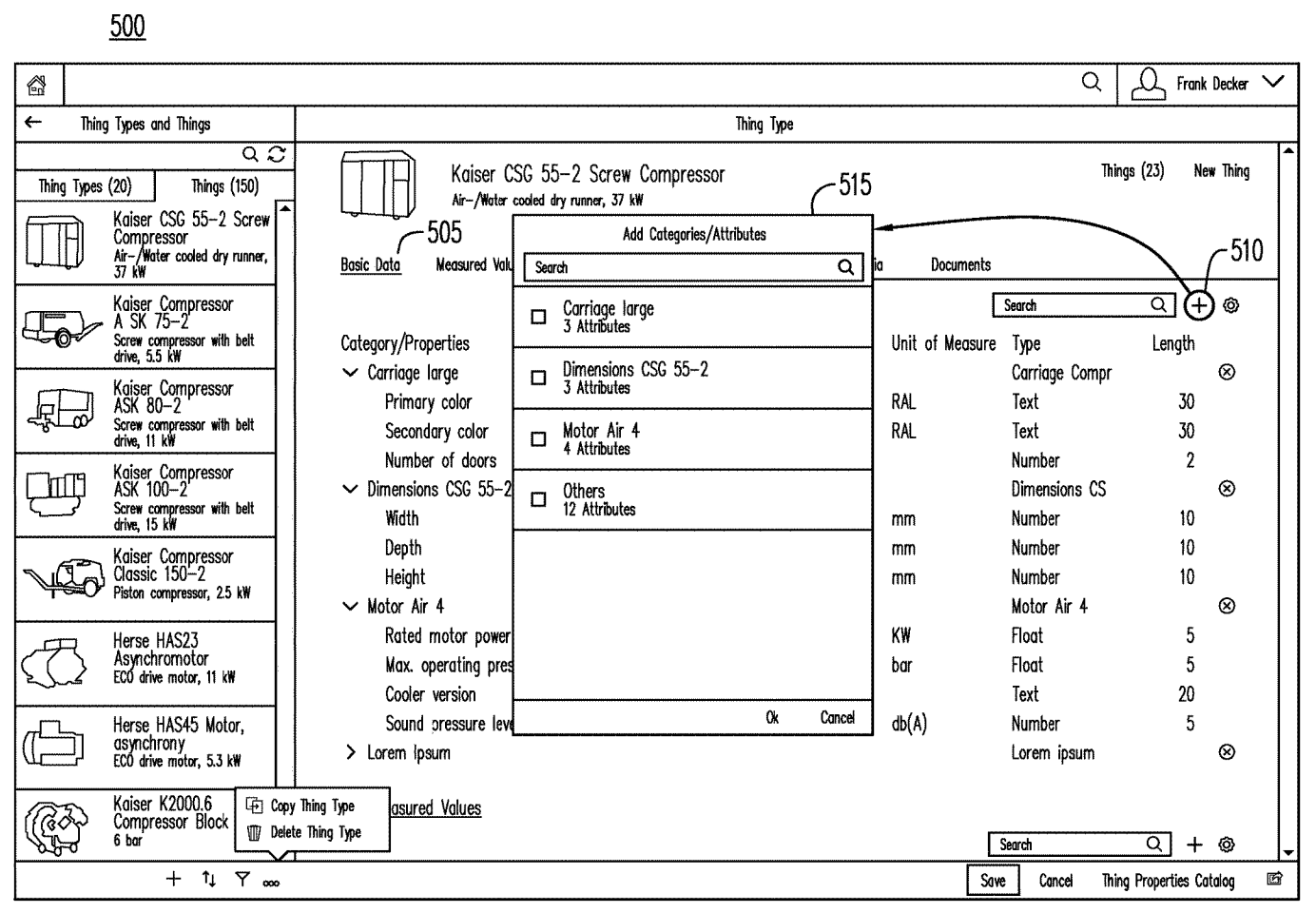

FIG. 5 is an outward view of a UI 500, including a mechanism to add categories to the basic data information. As shown at 505, the basic data relating to the tts being defined is presented in UI 500. Selecting the add button 510 by a user causes the display of pop-up menu 515 that can be used to add categories and attributes to the basic data.

Figure 6:
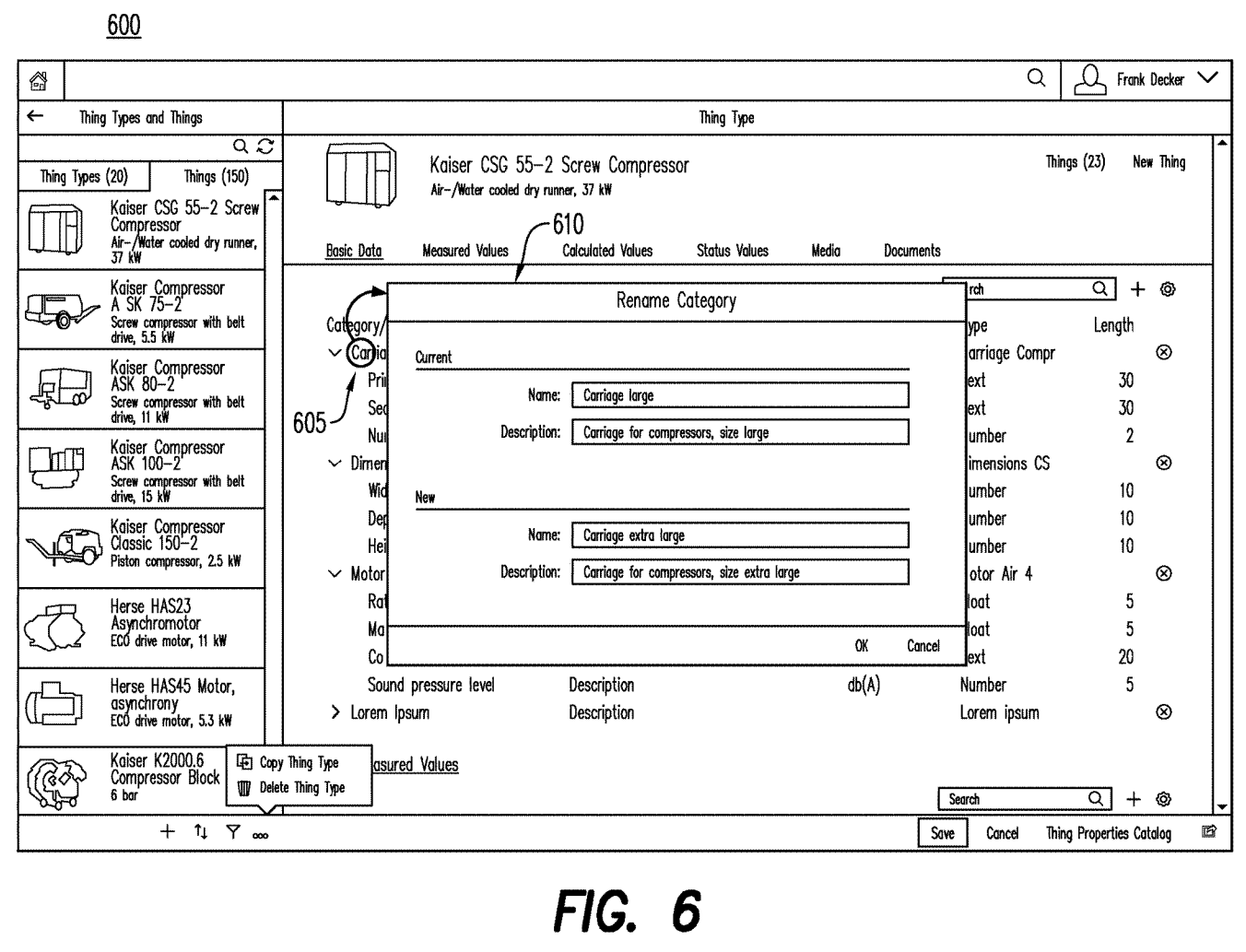

FIG. 6 illustrates one method for renaming a category (or other field) in some of the UIs herein. By way of example, a user selecting (e.g., double-clicking, log pressing, etc.) in the name of a category as shown at 605 in UI causes the UI to further display menu 610. Menu 610 includes fields for a user to specify a new name for a category of information, including a description that can be used to inform other/future users what the category relates to, in plain and understandable terms in some embodiments.

Figure 7:
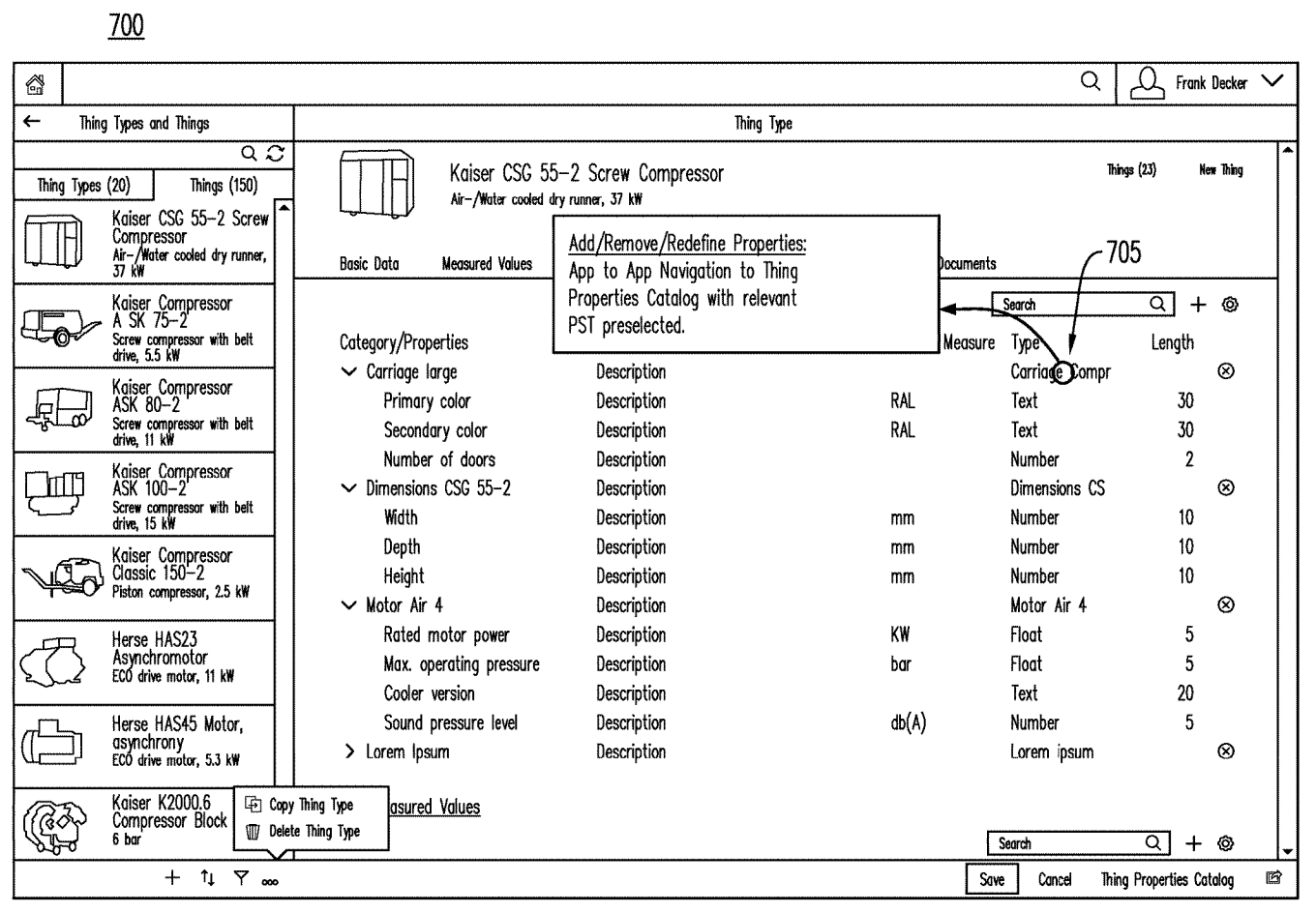

FIG. 7 illustrates one method for editing properties (or other field) in some of the UIs herein. UI 700 shows that a user might select property to cause a presentation of a menu 705 or other UI feature that can be used to edit the selected property. In this manner, a user can select the property to be edited directly, without navigating to a different screen. In some embodiments, a UI might include one or more options to add and/or edit properties directly in a current application or, as particularly shown in FIG. 7, options to cross-navigate into another application to add, remove, and/or redefine properties therein.

Figure 8:
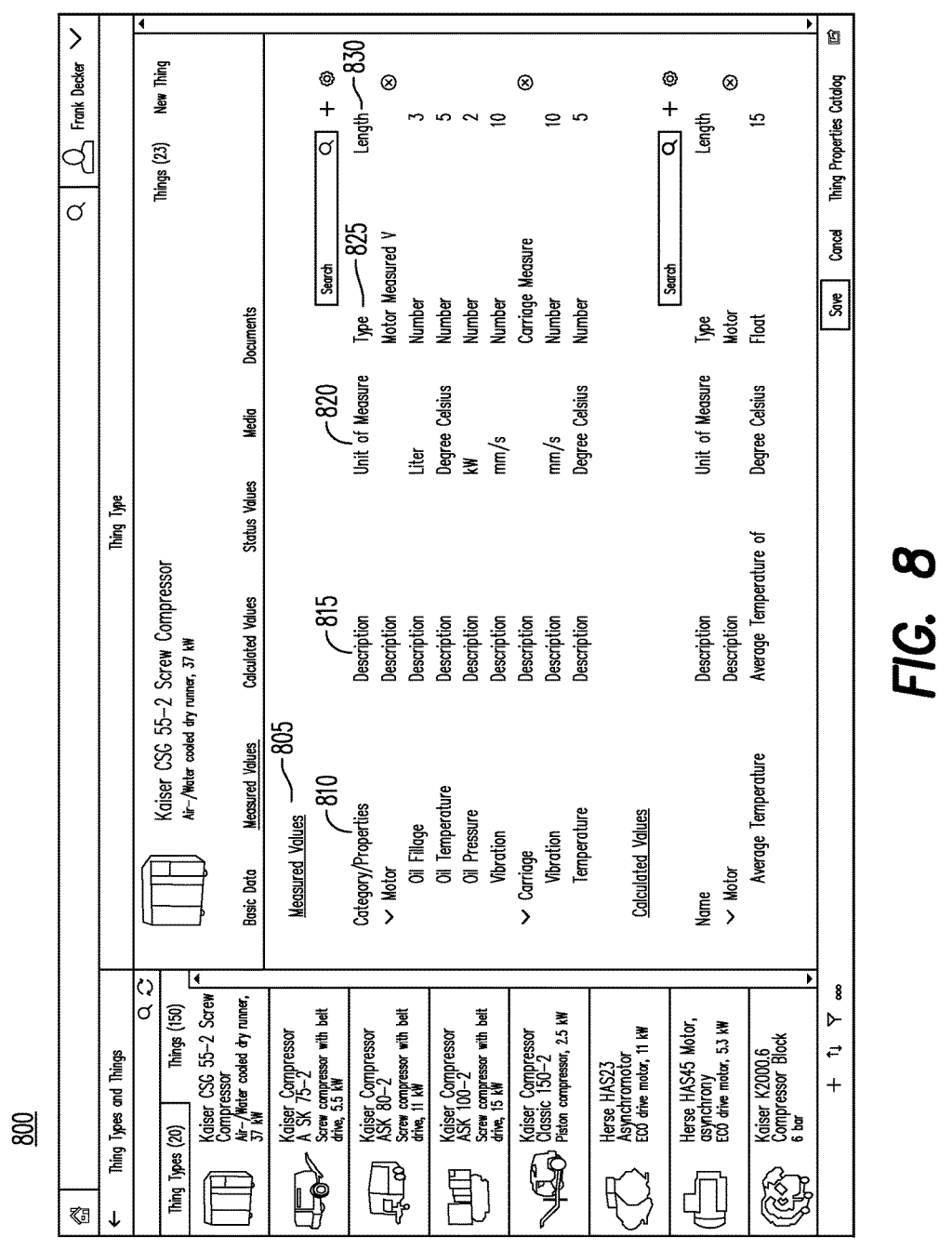

FIG. 8 is an outward view of a UI 800, including a presentation of different data points of a thing type being modeled or created by the thing modeler. Measured values are shown at 805 and there are a number of fields of information relating thereto. The related fields include the categories or properties 810, the description of the particular category/property, a unit of measure for the property 820, the type of property as shown at 825, a and length for the property 830. The measured values specified in UI 800 are the values' data points for a corresponding thing in the real world. The measured values may be taken from the machine of interest and/or the surrounding environment of the machine.

Figure 9:
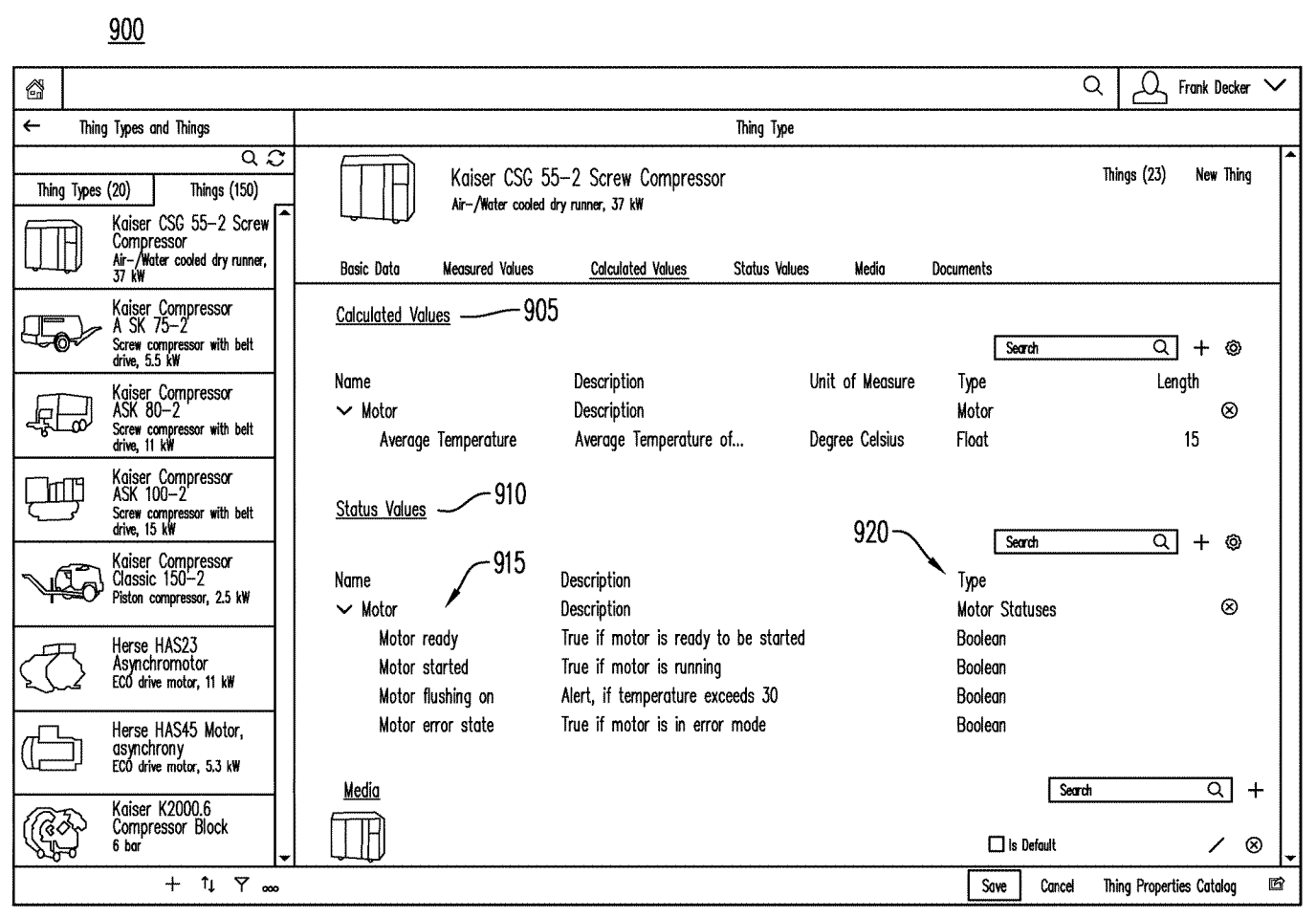

UI 900 in FIG. 9 is an outward view of a UI that includes fields for specifying and defining calculated values for a type of thing. The calculated values 905 here are based, at least in part, on the measured values illustrated in UI 800 of FIG. 8. In this manner, the calculated values 905 are intrinsically tied to the real-world thing. As seen, provisions are made for specifying a description, unit of measure, type, and length for the calculated values. UI 900 also includes UI mechanisms related to values for different states 910 of the type of thing being defined. In the example of FIG. 9, the states relate to the motor of the thing as shown at 915. Here, each state is a Boolean value 920, however other values may be possible in some instances.

Figure 10:
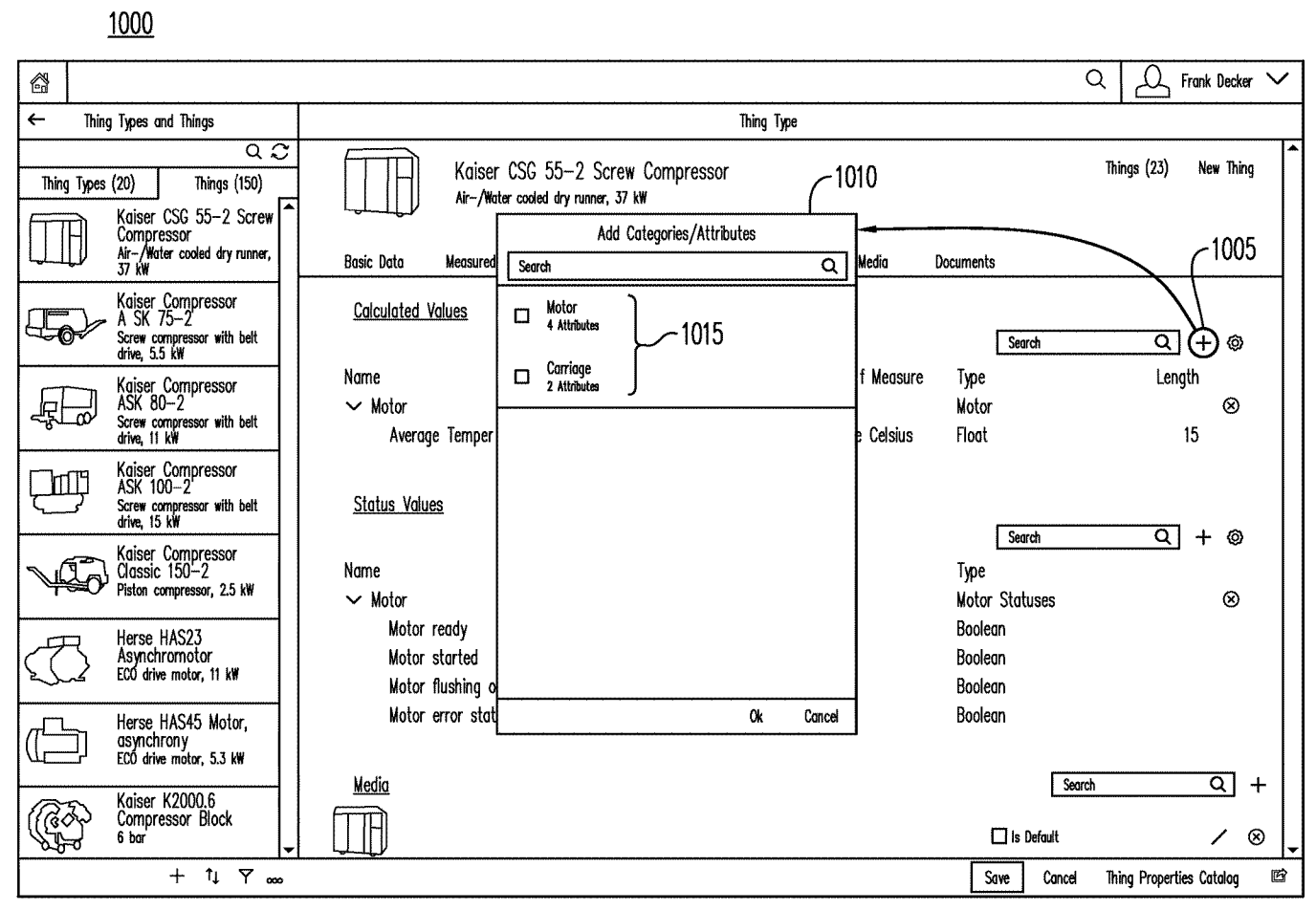

FIG. 10 is an outward view of a UI 1000, including a mechanism to add categories and properties to the current status values of a thing type. As shown at 1005, the add button can be selected to cause the display 1010 of a UI element to receive indications of categories and attributes to compliment the categories 1015. Other values other than the status values can be modified in a like manner.

Figure 11:
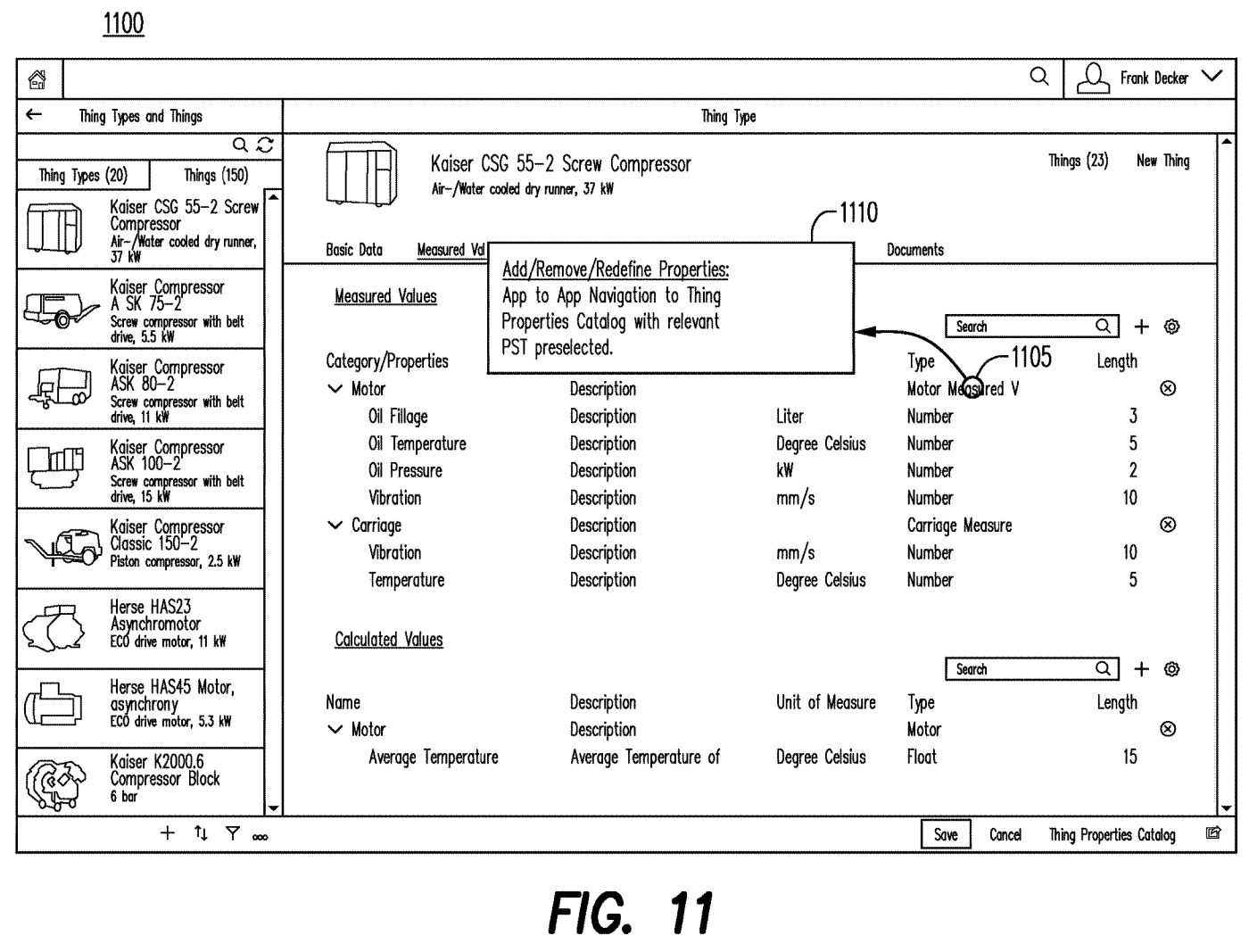

FIG. 11 is an outward view of a UI 1100, including a mechanism 1110 to add, redefine, and rename properties. As shown at 1105, selecting a property (e.g., a specific property of the motor's measured values) may navigate the user to a properties catalog that includes relevant properties that can be selected and used to specify/define the thing type be created in the example of FIG. 11. Similar to FIG. 7, FIG. 11 is a UI that includes a mechanism to cross-navigate to another application to add, remove, and/or redefine properties via the other application.

Figure 12:
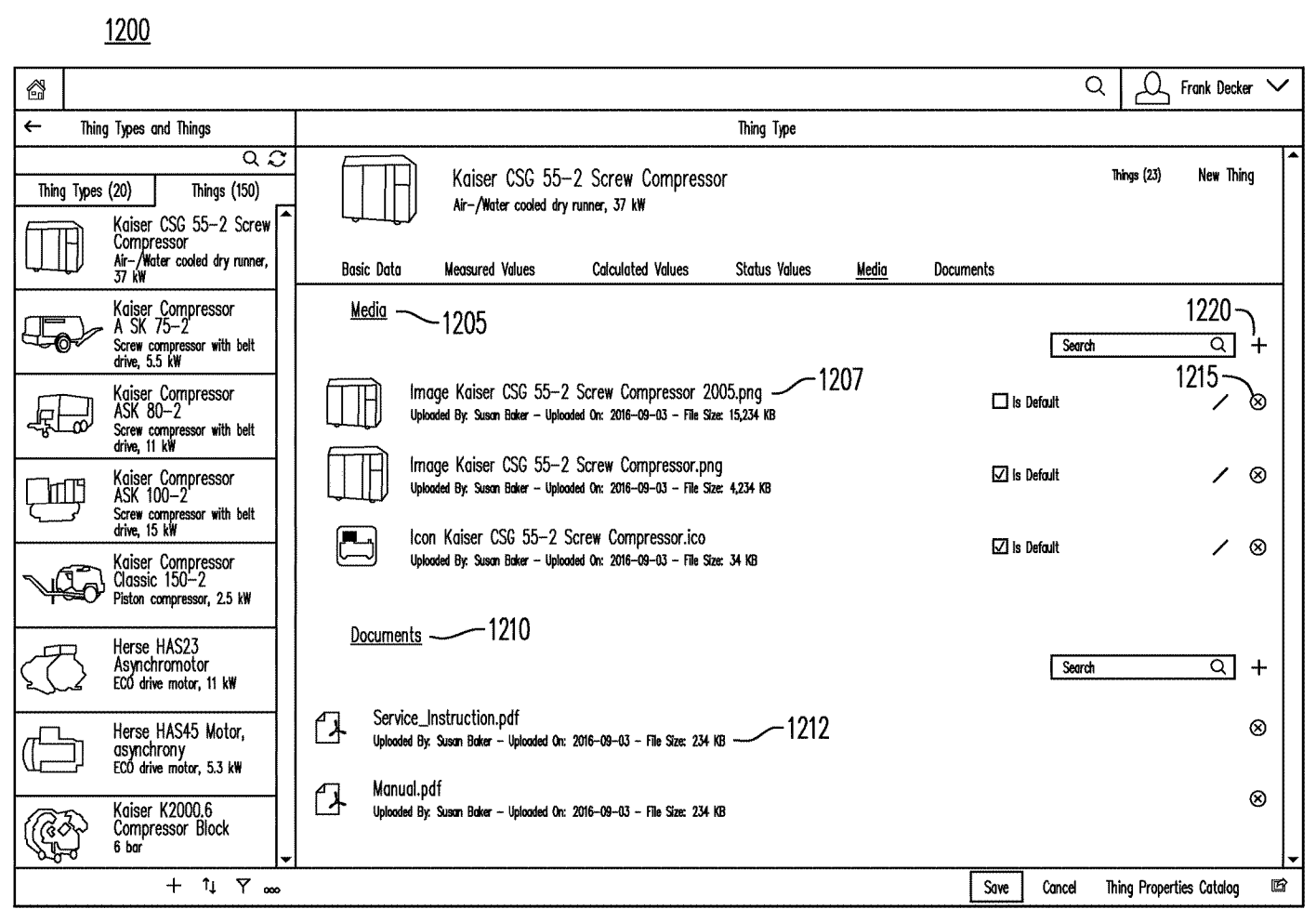

FIG. 1200 is an outward view of a UI 12 relating to the media 1205 and document 1210 types of information for the thing type being created in the present example. In general, the media 1207 and documents 1212 represented in FIG. 12 are locations (i.e., sources) of the noted media files or document files. In some embodiments, the media and document files may be maintained by the system supporting the disclosed thing modeler. In some embodiments, another device, system, or service may maintain (e.g., store) the referenced media and document files. UI elements are shown for deleting and adding one or more of the media and document files, 1215 and 1220, respectively.

Figure 13:
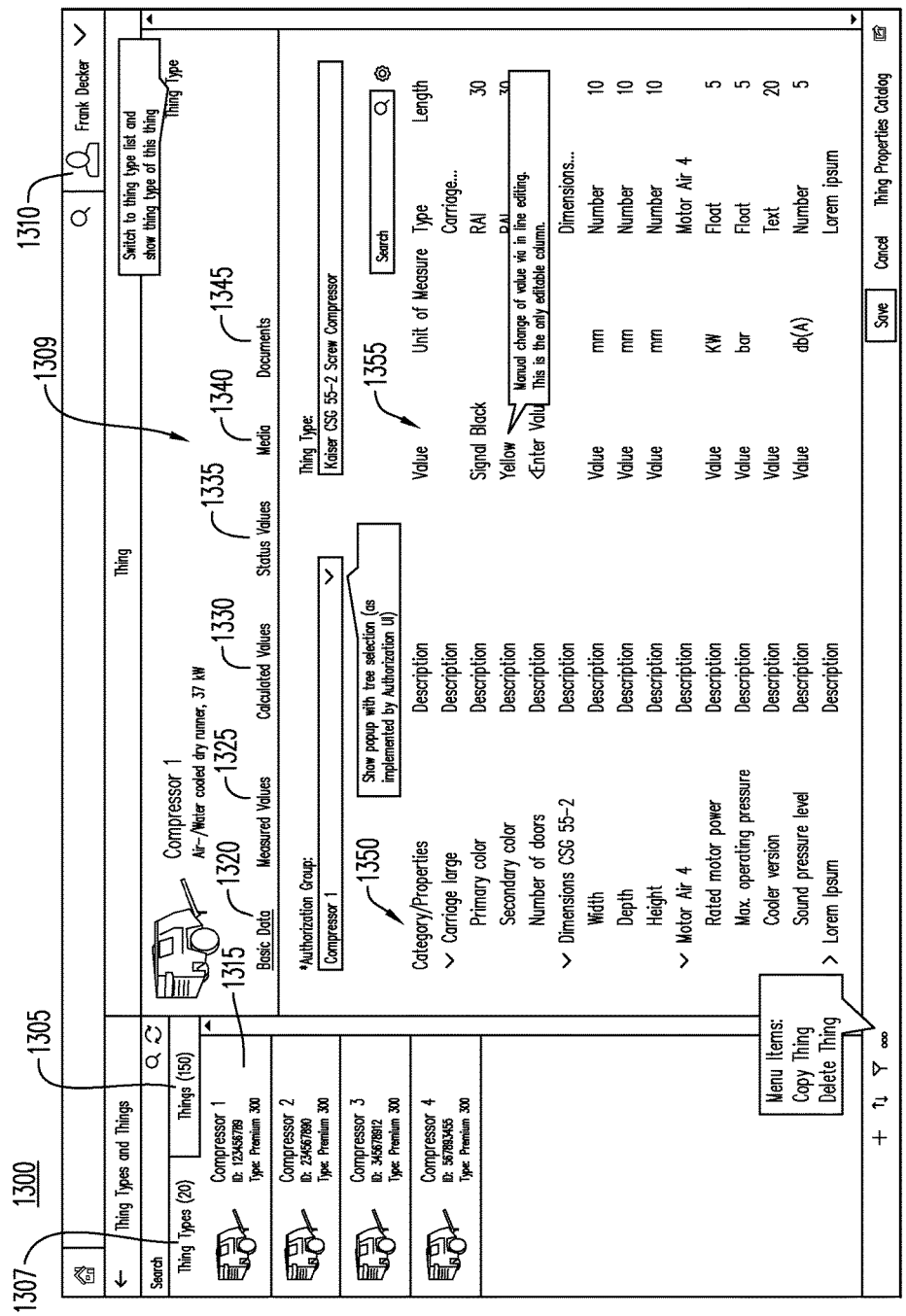
FIG. 13 is an outward view of an example embodiment of a user interface of an embodiment herein.

FIG. 13 is an outward view of a UI 1300, including a listing of things (i.e., instances of thing types) to be created or modeled by the thing modeler herein. As shown at 1305, the things of a particular thing type are listed at 1315. The particular thing type may have been earlier specified by selecting it via UI tab 1307. Having selected a thing type, the things corresponding thereto are listed under 1305. Details for the selected thing are shown in work area 1309, including fields for basic data 1320, measured values 1325, calculated values 1330, status values 1335, media 1340, and documents 1345 relating to the selected thing. These types of information may be similar to those described relating to the thing types in FIGS. 4-12. The categories and attributes for the things being modeled are listed under 1350. Regarding the things, the specific values 1355 for the different categories and attributes may be the only editable parameter. This may be the case since the other columns are defined and set by the thing type itself.

Figure 14:
FIG. 14 is an outward view of an example embodiment of a user interface of an embodiment herein.

FIG. 14 is an outward view of a UI 1400, including a mechanism to specify values for the measured and calculated values of the thing being created (i.e., modeled). The specific values for the particular instance of the thing type of interest are measured at the data point side, communicated to the platform and therewith to the thing modeler. The value fields may thus be automatically populated by the thing modeler application as shown at columns 1405 and 1410 for the respective measured values and calculated values. These values may be periodically updated, including as they change in the real world for the corresponding real-world thing.

Figure 15:
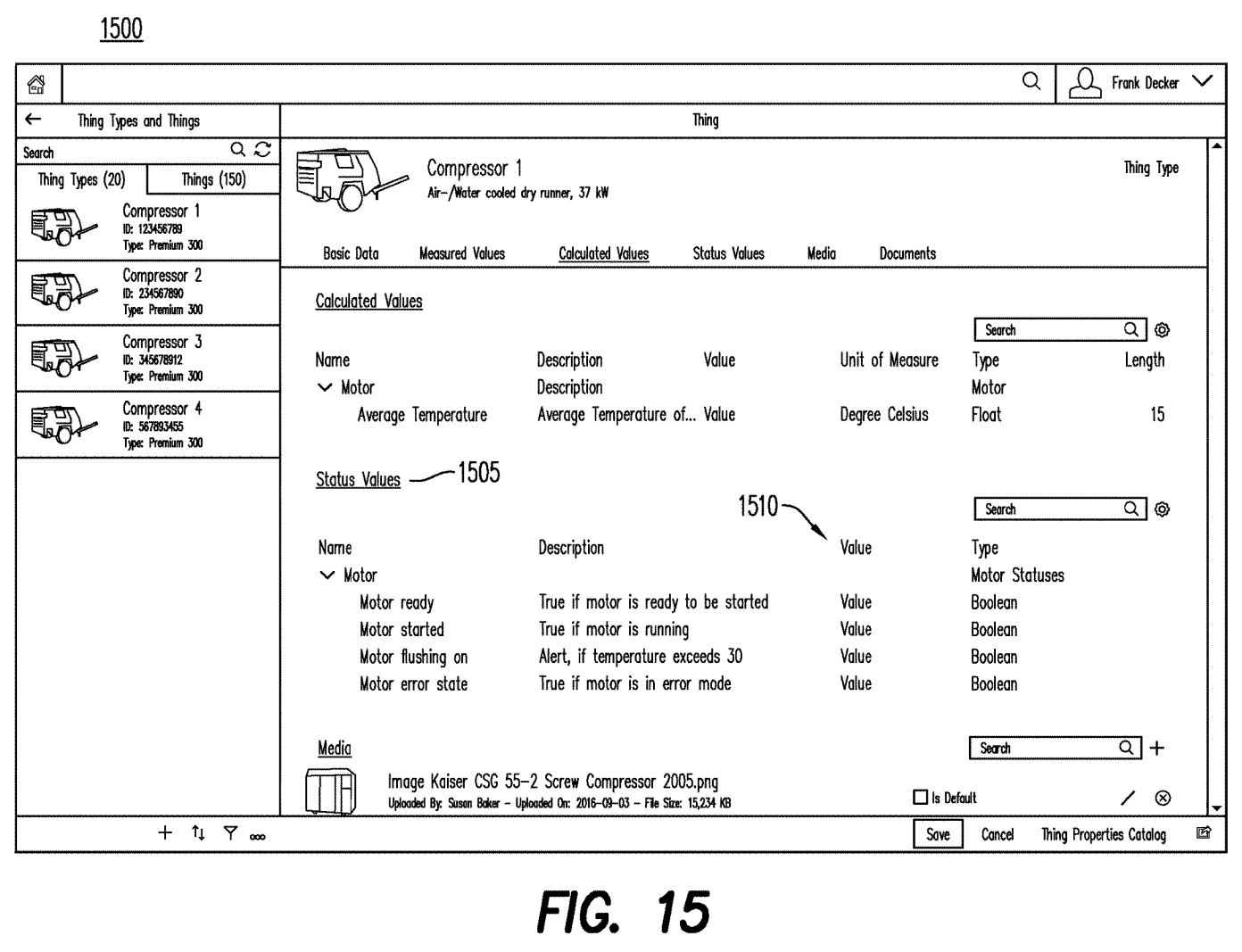

FIG. 15 is an outward view of a UI 1500, including a mechanism to add specific values for the value fields for the different status values 1505. The values at 1510 may be updated to reflect the status of the actual (i.e., real) machine or device corresponding to the instance of the thing being modeled in the example of FIG. 15.

Figure 16:
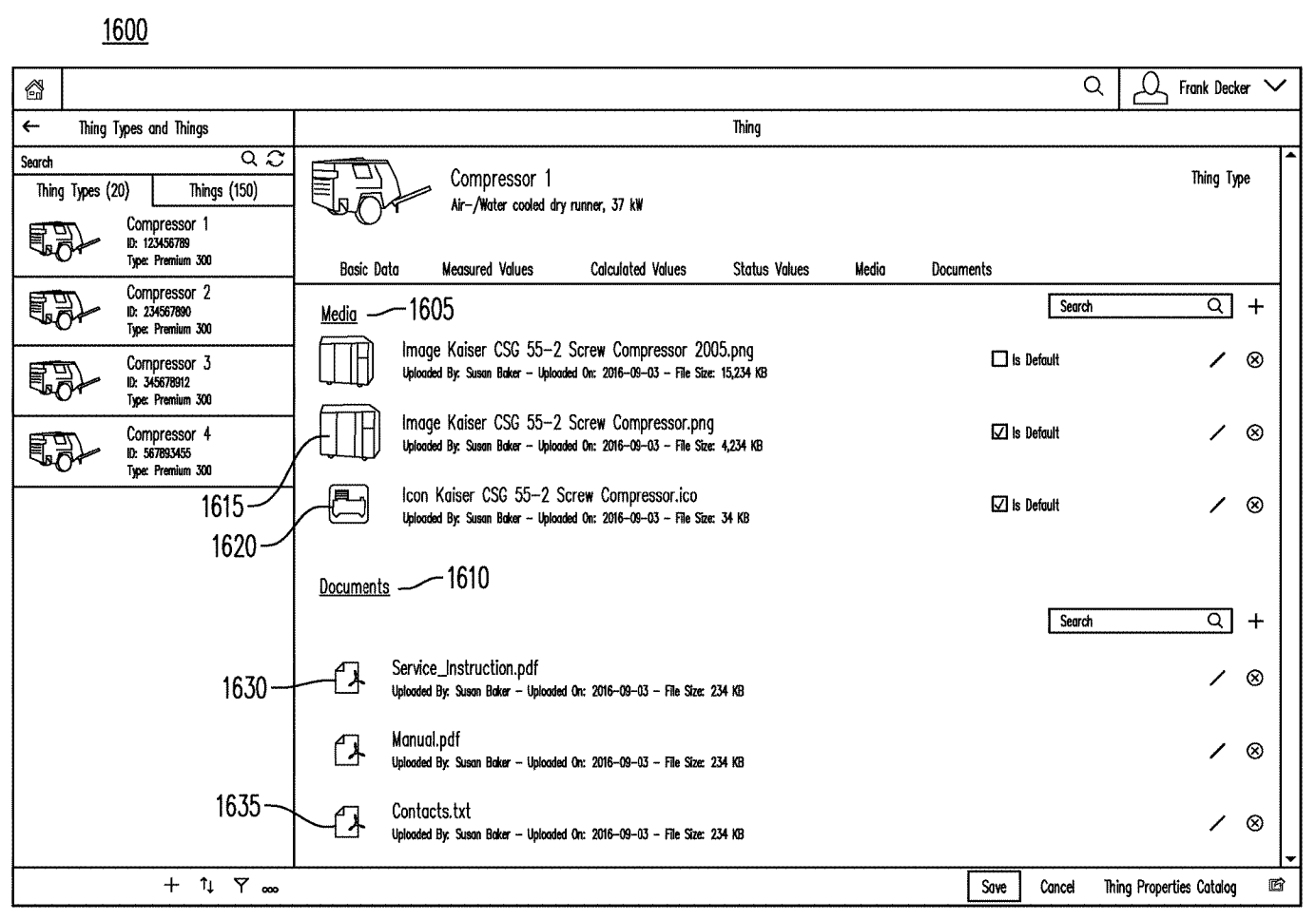

FIG. 16 is an outward view of a UI 1600, including a listing or other UI representation for media 1605 and documents 1610 to be associated with a thing being modeled. As shown at different icons 1615 and 1620 may be used to indicate the type of media files referenced. Likewise, different icons 1630 and 1635 may be used to indicate the type of documents referenced and linked to the thing being modeled. In some instances, the media and document files may include maintenance records, user manuals, and other discourses.

Figure 17:
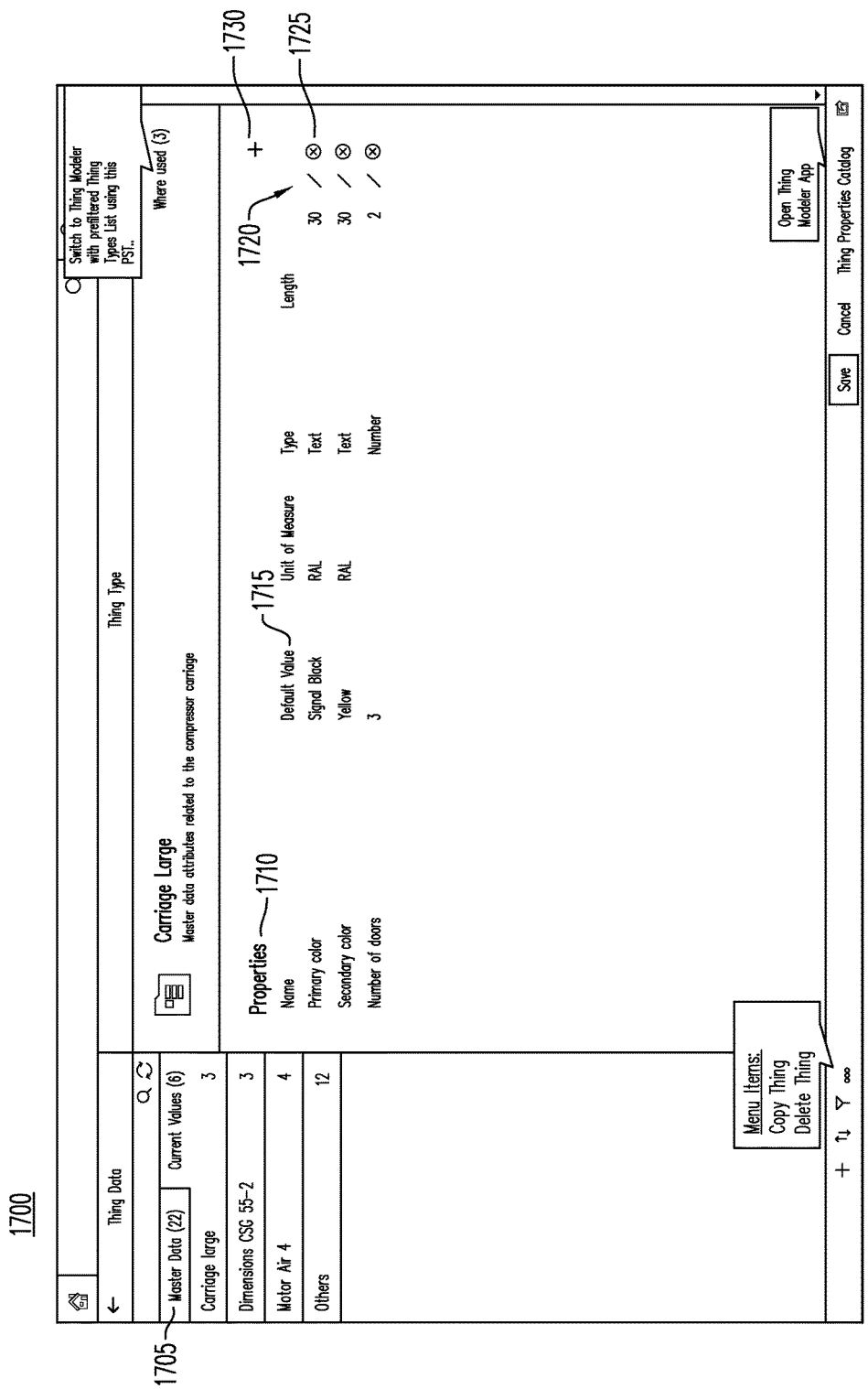
FIG. 17 is an outward view of an example embodiment of a user interface of an embodiment herein.

FIG. 17 is an outward view of a UI 1700, relating to a thing properties catalog in an example embodiment herein. Master data 1705 may be specified for the properties of things, including thing types and things. For each of the categories of data, there are fields for the particular properties thereof 1710, default values 1715, and other fields. UI 1700 includes UI mechanism to edit 1720, delete 1725, and add properties to those already listed.

Figure 18:
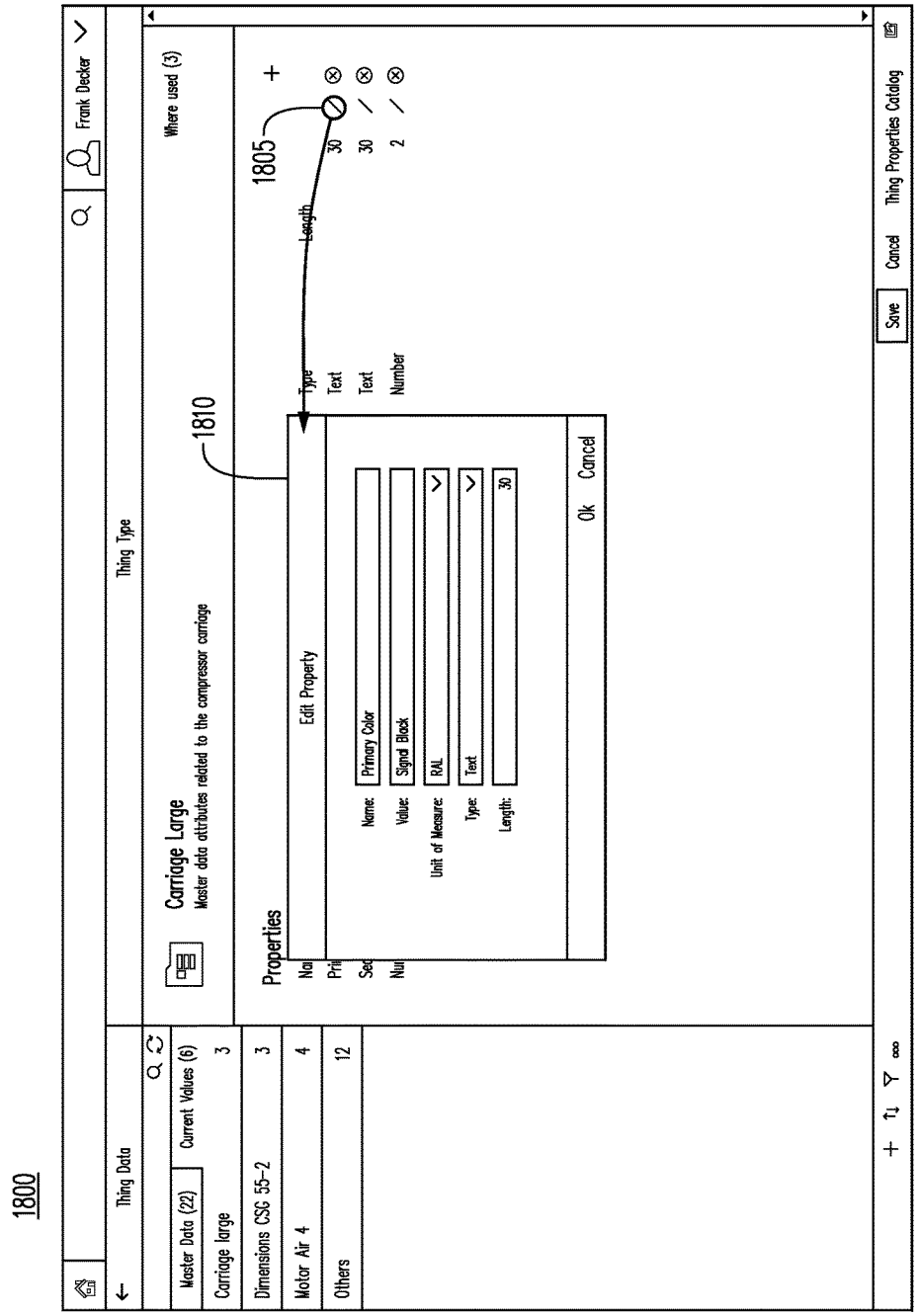
FIG. 18 is an outward view of an example embodiment of a user interface of an embodiment herein.

FIG. 18 is an outward view of a UI 1800, relating to a master data properties of a properties catalog in an example embodiment herein. UI element 1805 may be selected to edit the properties and cause the presentation of pop-up menu 1810. A user can specify the default values for the property in the pop-up menu 1810.

FIG. 19 is an outward view of a UI 1900, relating to a thing properties catalog in an example embodiment herein. In particular, the measured values 1905, calculated values 1910, and status values 1915 can be specified by a user, in a manner similar to that described for the thing types and things herein.

Figure 20:
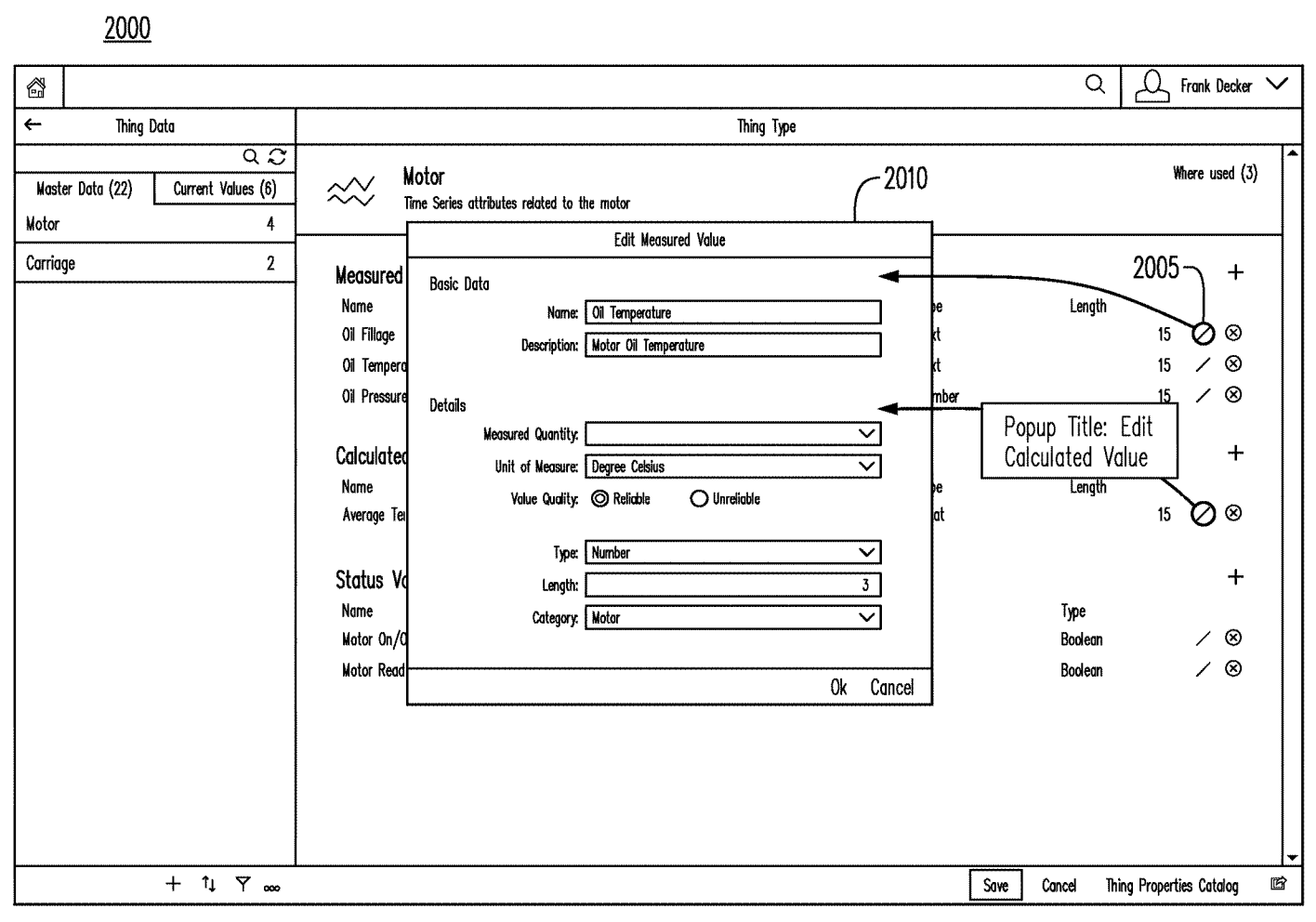

FIG. 20 is an outward view of a UI 2000, relating to editing measured values and calculated values in a thing properties catalog in an example embodiment herein. By selecting the UI button 2005 to edit a property, the pop-up menu 2010 is presented to a user. A user can then specify the desired parameters using the interface of the menu.

Figure 21:
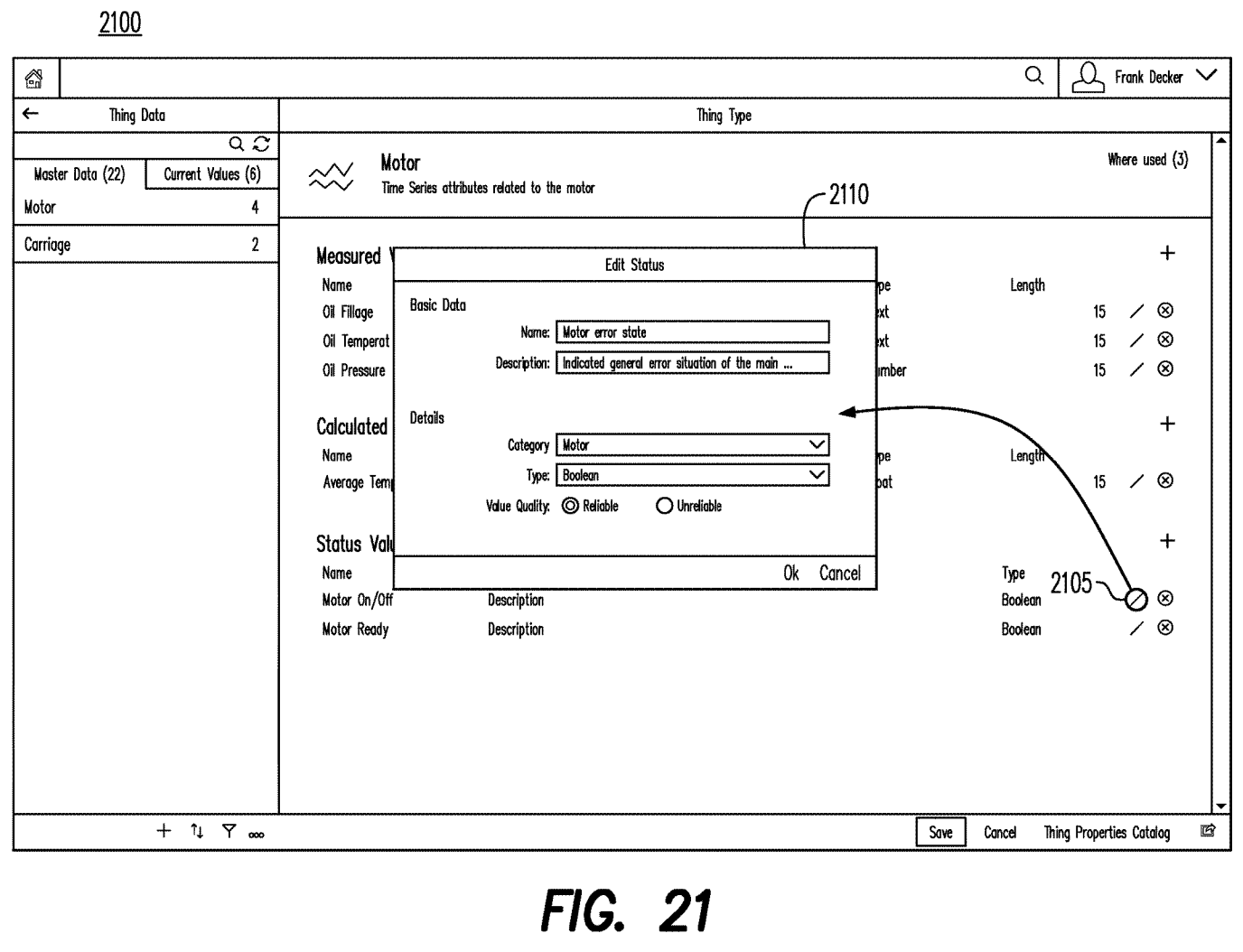

FIG. 21 is an outward view of a UI 2100, relating to a thing properties catalog in an example embodiment herein. By selecting the UI button 2105 to edit the status property, the pop-up menu 2010 is presented to a user. A user can then specify the desired parameters using the interface of the menu.

FIG. 22 relates to a process to create a model of a thing type, in accordance with an example embodiment herein. At operation 2205, an indication of a model of a thing type to be defined is received by a system, device, or service. The indication may be received from a user such as, for example, a thing engineer via a UI. The UI may be similar to one or more of the UIs disclosed herein. The thing type may be a data structure or a category of a thing representing a real-world entity (e.g., machine, device, system, etc.)

At operation 2210, an indication of one or more basic data properties defining characteristics of the thing type are received. Operation 2215 includes the reception of data points for the thing type, operation 2220 includes reception of an indication of different states to define the thing type, and operation 2225 includes receiving an indication of at least one media file or document type file to associate with the thing type.

All of the indications of different types of information may be saved to a record at operation 2230. Operation 2230 includes processing of the received information to create a reusable model of a thing type. The thus created thing type may be used to represent real-world categories of things and can be used by, for example, IoT applications.

FIG. 23 relates to a process to create a model of a thing, in accordance with an example embodiment herein. At operation 2305, an indication of a model of a thing to be defined is received by a system, device, or service. The indication may be received from a user via a UI. The UI may be similar to one or more of the UIs disclosed herein. The thing type may be a data structure or a category of a thing representing a real-world entity (e.g., machine, device, system, etc.)

At operation 2310, an indication of one or more properties defining characteristics of the thing type are received. Each property has a value field. At operation 2315, an indication of the value to assign to each of the value fields is received from the user.

Operation 2320 includes the reception of data points for the thing, operation 2325 includes reception of an indication of different states to define the thing, and operation 2330 includes receiving an indication of at least one media file or document type file to associate with the thing. All of the indications of different types of information may be saved to a record at operation 2335. Operation 2235 may include processing of the received information to create a reusable model of a thing. The thus created thing may be used to represent real-world categories of things and can be used by, for example, IoT applications.

Figure 24:
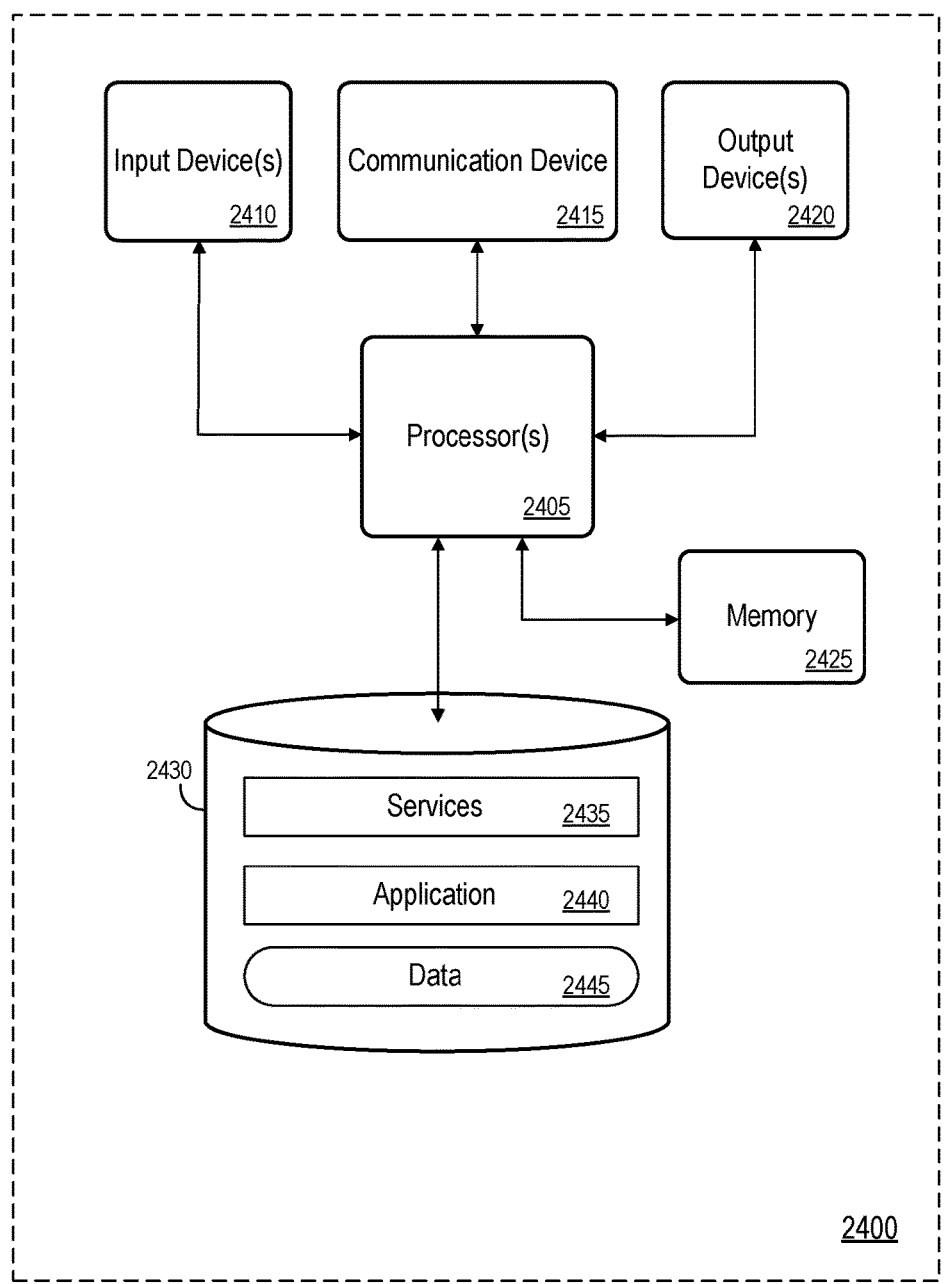
FIG. 24 is an example schematic diagram of a system in an embodiment herein.

FIG. 24 illustrates an exemplary system diagram for performing the processed described herein. Apparatus 2400 includes processor 2405 operatively coupled to communication device 2420, data storage device 2430, one or more input devices 2410, one or more output devices 2420 and memory 2425. Communication device 2415 may facilitate communication with external devices, such as a reporting client, or a data storage device. Input device(s) 2410 may comprise, for example, a keyboard, a keypad, a mouse or other pointing device, a microphone, knob or a switch, an infra-red (IR) port, a docking station, and/or a touch screen. Input device(s) 2410 may be used, for example, to enter information into apparatus 2400. Output device(s) 2420 may comprise, for example, a display (e.g., a display screen) a speaker, and/or a printer.

Data storage device 2430 may comprise any appropriate persistent storage device, including combinations of magnetic storage devices (e.g., magnetic tape, hard disk drives and flash memory), optical storage devices, Read Only Memory (ROM) devices, etc., while memory 2425 may comprise Random Access Memory (RAM), Storage Class Memory (SCM) or any other fast-access memory.

Services 2435 and application 2440 may comprise program code executed by processor 2405 to cause apparatus 2400 to perform any one or more of the processes described herein (e.g., 200, 300). Embodiments are not limited to execution of these processes by a single apparatus.

Data 2445 (either cached or a full database) may be stored in volatile memory such as memory 2425. Data storage device 2430 may also store data and other program code and instructions for providing additional functionality and/or which are necessary for operation of apparatus 2400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
receive, from a user via a user interface, an indication of a model of a thing type to define, the thing type being a data structure of a category of a thing in an Internet of Things environment representing a real world entity and the thing being a data structure defining an instance of the thing type, the user interface including user interface elements to create and edit both a thing type model and at least two instances of the thing type model for a particular thing;
receive, from the user via the user interface, an indication of one or more properties defining characteristics of the thing type;
receive, from the user via the user interface, an indication of one or more data points to define at least one property of the thing type, each data point associated with periodically updated values;
receive, from the user via the user interface, an indication of one or more states to define at least one aspect of the thing type;

receive, from the user via the user interface, an indication of a source for at least one of a media file and a document file to associate with the thing type;

receive, from the user via the user interface, indications of specific values to be assigned to value fields of the one or more properties, the one or more data points, and the one or more states to define the thing;

save a record of the received indications defining the model of the thing type and the at least two instances of the thing type model in a persistent memory; and generate a thing type model based on the saved record of the received indications defining the model of the thing type.

2. The system of claim 1, wherein the user is granted permission to provide the indications defining the model of the thing type based on a role of the user with the system.

3. The system of claim 1, wherein the processor is further enabled to execute the processor-executable instructions to cause the system to:

receive, from the user, a request to define the model of the thing type; and present, in response to the request, a representation of the model of the thing type to be defined.

4. The system of claim 3, wherein the request includes an indication of whether the request is to define a new thing type or a pre-existing thing type.

5. The system of claim 1, wherein the one or more data points are one of a measured value and a calculated value based on a measured value.

6. The system of claim 1, wherein the processor is further enabled to execute the processor-executable instructions to cause the system to:

receive, from the user, a request of one of following types: to add a new category, to rename a category, to edit the properties, to edit the one or more states, to add a new media file, and to add a new document file; and present, in response to the request, a representation of one or more of the new category, the renamed category, the edited properties, the edited states, the new media file, and the new document file.

7. A system comprising:

a memory storing processor-executable instructions; and a processor to execute the processor-executable instructions to cause the system to:

receive, from a user via a user interface, an indication of a model of a thing type to define and an indication of a model of a thing to define, the thing being a data structure defining an instance of a thing type and the thing type being a data structure of a category of a thing in an Internet of Things environment representing a real world entity, the user interface including user interface elements to create and edit both a thing type model and at least two instances of the thing type model for a particular thing;

receive, from the user via the user interface, an indication of one or more properties defining characteristics of the thing, each property having a value field;

receive, from the user via the user interface, an indication of a specific value to assign to each of the value fields of the properties of the thing;

receive, from the user via the user interface, an indication of one or more data points to define at least one property of the thing, each data point associated with periodically updated values;

receive, from the user via the user interface, an indication of one or more states to define at least one aspect of the thing;

receive, from the user via the user interface, an indication of one or more properties defining characteristics of the thing type, each property having a value field;

receive, from the user via the user interface, an indication of one or more data points to define at least one property of the thing type, each data point associated with periodically updated values;

receive, from the user via the user interface, an indication of one or more states to define at least one aspect of the thing type;

receive, from the user via the user interface, an indication of a source for at least one of a media file and a document file to associate with the thing;

receive, from the user via the user interface, indications of specific values to be assigned to value fields of the one or more properties, the one or more data points, and the one or more states to define the thing;

save a record of the received indications defining the model of the thing type, the model of the thing, and the at least two instances of the thing type model in a persistent memory;

generate a thing type model based on the saved record of the received indications defining the model of the thing type; and generate an instance of a thing based on the saved record of the received indications defining the model of the thing.

8. The system of claim 7, wherein the user is granted permission to provide the indications defining the model of the thing based on a role of the user with the system.

9. The system of claim 7, wherein the processor is further enabled to execute the processor-executable instructions to cause the system to:

receive, from the user via the user interface, a request to define the model of the thing; and present via the user interface, in response to the request, a representation of the model of the thing to be defined.

10. The system of claim 9, wherein the request includes an indication of whether the request is to define a new thing or a pre-existing thing.

11. The system of claim 7, wherein the one or more data points are one of a measured value and a calculated value based on a measured value.

12. The system of claim 7, wherein the processor is further enabled to execute the processor-executable instructions to cause the system to:

receive, from the user via the user interface, a request of one of following types: to add a new media file, to add a new document file, to rename a category, to edit the properties, to edit the one or more states; and present via the user interface, in response to the request, a representation of the new media file and the new document file.

13. A computer-implemented method, the method comprising:

receiving, from a user via a user interface of a device having a processor, an indication of a model of a thing type to define, the thing type being a data structure of a category of a thing in an Internet of Things environment representing a real world entity and the thing being a data structure defining an instance of the thing type, the user interface including user interface elements to create and edit both a thing type model and at least two instances of the thing type model for a particular thing;

receiving, from the user via the user interface of the device, an indication of one or more properties defining characteristics of the thing type;

receiving, from the user via the user interface of the device, an indication of one or more data points to define at least one property of the thing type, each data point associated with periodically updated values;

receiving, from the user via the user interface of the device, an indication of one or more states to define at least one aspect of the thing type;

receiving, from the user via the user interface of the device, an indication of a source for at least one of a media file and a document file to associate with the thing type;

receiving, from the user via the user interface, indications of specific values to be assigned to value fields of the one or more properties, the one or more data points, and the one or more states to define the thing for at least one of a category and an attribute;

saving a record of the received indications defining the model of the thing type and the at least two instances of the thing type model in a persistent memory; and generating a thing type model based on the saved record of the received indications defining the model of the thing type.

14. The method of claim 13, wherein the user is granted permission to provide the indications defining the model of the thing type based on a role of the user with the system.

15. The method of claim 13, further comprising:

receiving, from the user via the user interface of the device, a request to define the model of the thing type; and presenting via the user interface, in response to the request, a representation of the model of the thing type to be defined.

16. The method of claim 15, wherein the request includes an indication of whether the request is to define a new thing type or a pre-existing thing type.

17. The method of claim 13, wherein the one or more data points are one of a measured value and a calculated value based on a measured value.

18. The method of claim 13, further comprising:

receiving, from the user via the user interface of the device, a request of one of following types: to add a new category, to rename a category, to edit the properties, to edit the one or more states, to add a new media file, and to add a new document file; and presenting via the user interface, in response to the request, a representation of one or more of the new category, the renamed category, the edited properties, the edited states, the new media file, and the new document file.

* * * * *